Oct. 2, 1934.  J. L. CREVELING  1,975,311
LUBRICATION DEVICE
Filed Sept. 17, 1931   2 Sheets-Sheet 2
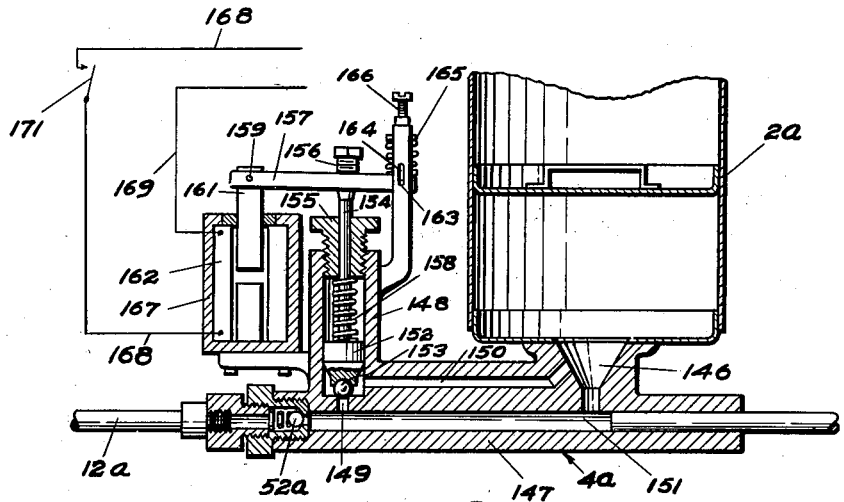
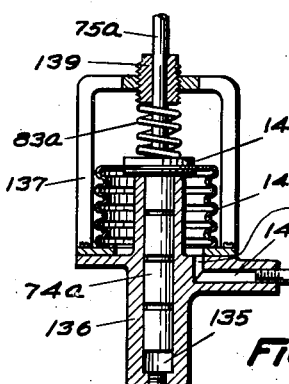
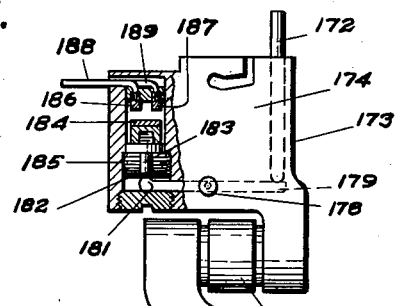
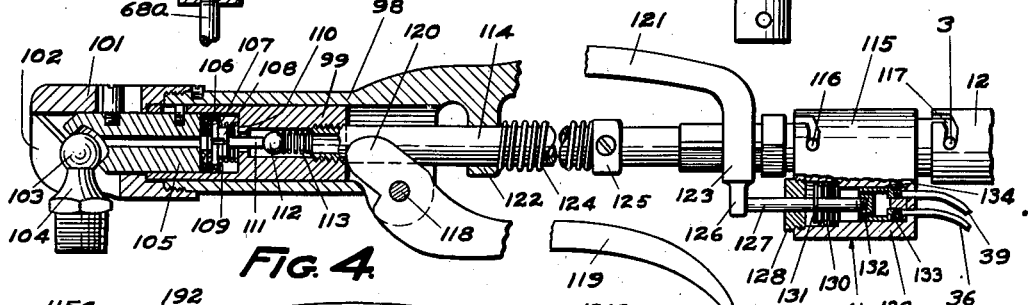
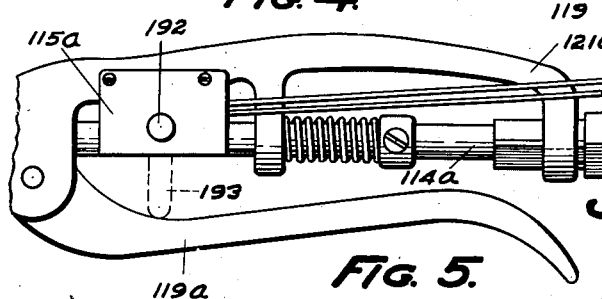
INVENTOR.
JOHN L. CREVELING
BY
ATTORNEY.

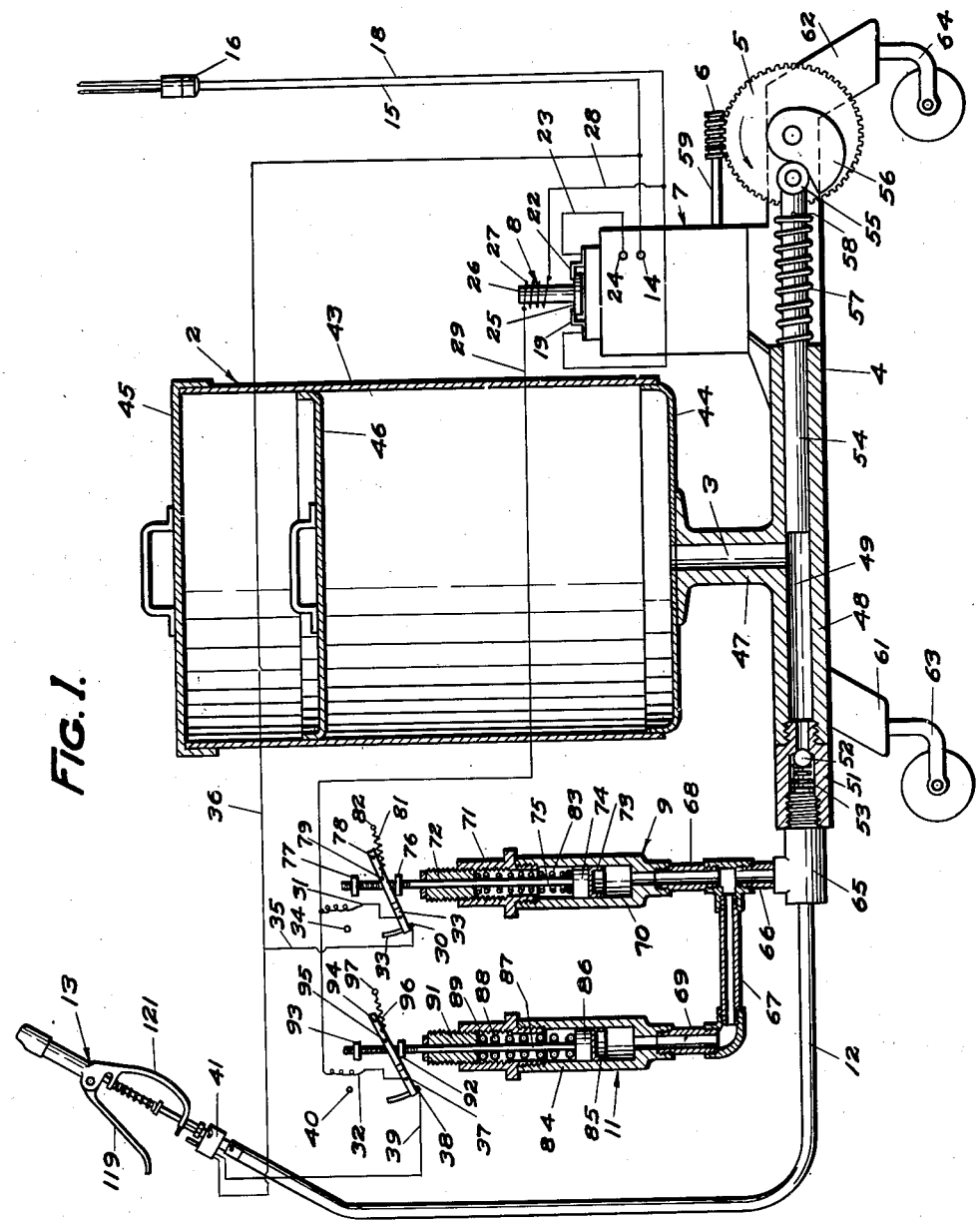

Patented Oct. 2, 1934

1,975,311

UNITED STATES PATENT OFFICE 1,975,311

LUBRICATION DEVICE

John L. Creveling, Tucson, Ariz., assignor to The Lubrication Corporation, South Bend, Ind., a corporation of Delaware Application September 17, 1931, Serial No. 563,411

24 Claims. (Cl. 221—47.1)

This invention relates to lubrication devices and more specifically to a power system for supplying lubricant under pressure to fittings associated with bearings to be lubricated.

One of the objects of my invention is to provide a compact power system easily operated and capable of supplying adequate pressure to force lubricant to fittings under substantially all conditions.

A further object of the invention is to provide a system for lubricating bearings in which electric energy may be utilized in a practical manner.

A further object of the invention is to provide such a system having in combination with means for supplying lubricant to lubrication fittings under fairly high pressure, means for selectively applying much higher pressure when it is desired.

A further object of the invention is to provide in such a system a combined coupler and electric switch capable of connecting the source of lubricant supply with the fitting to be lubricated and, when desired, capable of controlling an electric motor adapted to operate a lubricant pump.

A further object of the invention is to provide in such a system a coupler for connecting the source of lubricant supply with the fitting to be lubricated having a movable element adapted by progressive actuation by the operator (1st) to resiliently clamp the fitting in the coupler, (2nd) to admit lubricant under relatively low pressure to the coupler for supply to the fitting, (3rd) to clamp the fitting more firmly by means of lubricant pressure, and (4th) to supply lubricant under much higher pressure and at the same time clamp the fitting more firmly corresponding to the higher pressure.

A further object of the invention is to provide an improved type of pump for forcing lubricant through various conduits into the fittings to be lubricated.

Further objects will be apparent after a reading of the subjoined specification and claims and after a consideration of the attached drawings.

In order to explain the invention more clearly I have shown several embodiments thereof in said drawings, in which:

Figure 1 is a diagrammatic sketch showing a system of lubrication illustrating my invention;

Figure 2 is a fragmentary diagram showing a portion of a modified system of lubrication;

Figure 3 is a view on an enlarged scale of a modified form of relay adapted to be used in a system similar to that shown in Figure 1, shown partly in section and partly in elevation;

Figure 4 is a sectional view on an enlarged scale of the combined coupler and switch shown diagrammatically in Figure 1;

Figure 5 is a fragmentary view of a portion of a modified form of coupler and switch; and Figure 6 is a fragmentary view generally in elevation and on an enlarged scale showing a modified form of switch adapted to be used in the lubrication system diagrammatically shown in Figure 1, parts of the casing being broken away to show more clearly the switch construction.

In general, I have shown in the drawings a container for lubricant and a cam operated plunger pump associated with said container and adapted to force the lubricant through a flexible conduit to a coupler which connects the conduit with the fittings to be lubricated. An electric motor is provided for driving the pump by means of a worm and worm gear, and an electrically operated switch is provided for controlling the electric motor. The electrically operated switch is itself controlled by one or more relays and by a manually operated switch, all so arranged that normally a fairly high pressure is maintained in the conduit, but so arranged that when the manual switch is closed a much higher pressure is built up and maintained therein. The coupler is provided with a pair of plier handles, and with a resiliently urged nozzle adapted to slide in a sleeve or casing to clamp the fittings adjacent to the end of the coupler. The coupler is so constructed that normal operation of the handles first moves the nozzle toward the fitting for clamping the fitting, and thereafter opens a valve to supply lubricant under pressure for servicing the fitting and also for aiding in clamping the fitting securely in the coupler. In case a fitting abnormally difficult to lubricate is encountered, a greater movement of the handles is adapted to close the manual switch previously mentioned so that the system becomes capable of greatly increasing the grease pressure supplied to the coupler, and so that the increased grease pressure may be utilized to clear the fitting.

Referring particularly to Figure 1 of the drawings, I have shown a lubricant container generally designated 2, having formed adjacent to and connected to the lower end thereof a passageway 3 through which lubricant may be fed downward into the barrel of the cam operated pump generally designated 4. The pump is driven through a worm wheel 5 and a worm 6 by an electric motor 7, which is controlled by a switch generally designated 8, in turn controlled by a pair of pressure operated controls on relays 9 and 11. The forward end of the pump 4 is connected to one end of a flexible hose 12 having the opposite end connected to a coupler generally designated 13, whereby lubricant may be supplied under pressure from the pump to the fittings to be lubricated.

Electric current is relied upon to furnish energy for driving the motor 7 as well as for operating the switch 8, so that the pressure of lubricant in the conduit 12 may be selectively controlled. To this end there are provided a plurality of electric wires or conduits connected with a source of electric energy. Connected to one terminal 14 of the electric motor 7 is a wire 15 leading to one terminal of a wall plug 16. Connected to the opposite terminal of the plug 16 is a wire 18 which leads to one terminal 19 of the relay operated switch or motor starter generally designated 8. The opposite terminal 22 of the switch 8 is connected to a wire 23 which leads to the other terminal 24 of the motor 7.

The switch 8 thus controls the motor 7 and the pump 4, and I provide pressure operated devices for controlling said switch 8 and thus am enabled to maintain the lubricant at the desired pressures. The switch 8 includes also a contact member 25 fastened in any convenient manner to a solenoid core 26 associated with a solenoid or coil 27. One terminal of the coil 27 is connected to a wire 28 which has its opposite end connected to the wire 18. The opposite terminal of the coil 27 is connected to one end of a wire 29 which, adjacent to its opposite end, is connected to branch wires 31 and 32 associated with the pressure operated relays 9 and 11, respectively. The branch wire 31 is connected to a pivoted contact bar 33 which is adapted to be limited in its upward movement by a stop 34, and which is adapted in its lower position (as shown) to contact with a terminal 30 to which is secured a branch wire 35 connected to a wire 36, in turn connected with the wire 15. The branch wire 32 is connected to a pivoted contact bar 37 which is adapted when in its lower position (as shown) to contact with a terminal 38 connected to one end of the wire 39, and which is limited in its upward movement by a stop 40. The opposite end of the wire 39 is connected to one side of a manually operated switch 41 and the end of the wire 36 opposite to its connection with the wire 15 is connected to the opposite side of the switch. It may thus be seen that when the switch 41 is open, the switch 8 will be controlled solely by the position of the contact bar 33. However, when the switch 41 is closed the switch 8 will be maintained closed (as shown) whenever either the contact bar 33 or the contact bar 37 is in its lower position and will open only when both of said contact bars have been raised. The relays 9 and 11 are so arranged that the pressure necessary to operate relay 11 is much greater than the pressure necessary to operate relay 9. By this arrangement it is evident that whenever switch 41 is closed relay 11 will in fact govern the pressure of lubricant in the conduit 12, while at such times that the switch 41 is open, the relay 9 alone will govern the pressure.

The means for supplying lubricant to the pump includes the container 2 which comprises a cylinder 43, a lower end member 44, and a cover 45. Within the container 2 there is provided a follower 46 of the atmospheric type such as the follower described and claimed in a patent to Morris No. 1,749,830. Secured to the lower end member 44 is a support 47 which is formed with the passageway 3 registering with an opening in the end member 44 and which may be formed integral with the barrel 48 of the pump 4.

The pump 4 is the means by which lubricant is forced under pressure to the flexible conduit 12. It is of the plunger type and is adapted to be driven by the motor 7. I provide means whereby a constant acceleration will be imparted to the plunger in its forcing stroke. The barrel 48 of the pump 4 is formed with a longitudinal bore 49 connected at its forward end by means of a plug 51 with the flexible lubricant conduit 12. The plug 51 is provided with a check valve 52 normally resiliently maintained upon its seat by a spring 53, the valve preventing lubricant (after being forced into the conduit 12) from returning to the bore 49 of the barrel 48. Slidably mounted in the bore 49 is the pump plunger 54 which has its rear end extending outwardly therefrom and which at its extreme rear end is provided with a cam roller 55 normally maintained in contact with a constant acceleration cam 56. The outwardly extending rear portion of the plunger 54 is encircled by a compression spring 57 bearing at its front end upon the barrel 48 of the pump and bearing at its rear end upon a pin 58 secured to said plunger 54. The cam 56 is secured to the worm wheel 5 and is driven by the motor 7 through said worm wheel 5, the worm 6, and a motor shaft 59 upon which said worm 6 is mounted. Formed integrally with or otherwise suitably secured to the pump barrel 48 are a pair of legs 61 and 62 having associated therewith a pair of casters 63 and 64 respectively. By means of the casters 63 and 64 the entire apparatus may be moved from place to place so that it may be most conveniently utilized for lubricating the fittings which it is desired to service.

As stated above, the relays 9 and 11 are provided for controlling the lubricant pressure. For example, the relay 9 may be set to control the pressure at 2,000 pounds, while relay 11 may be set to control it at 5,000 pounds. Connected to the conduit 12 is a T joint 65 which allows lubricant to pass therefrom through the pipes 66, 67, 68 and 69 to said pressure operated relays 9 and 11.

The relay 9 comprises a casing 70 into the lower end of which the pipe 68 is connected and the upper end of which is closed by plugs 71 and 72. Slidably mounted in the chamber formed in the casing 70 is a washer or piston 73 suitably associated with a plunger 74 which carries a rod or stem 75. The stem 75 extends upwardly through the plug 72 and carries adjacent to its upper ends a pair of adjustable spaced lugs 76 and 77, one or the other of which is normally adapted to bear upon opposite sides, respectively, of the contact bar 33. Lugs 76 and 77 are spaced so that only one bears upon the contact bar 33 at a time, appreciable travel of the stem 75 being necessary to bring the other lug into bearing relationship with said contact bar. The contact bar 33 is pivoted at 78 and has secured to it at 79 a tension spring 81 having its opposite end fixed to some stationary part of the system as at 82. Thus, because of the spring 81, the contact bar 33 is (except when being snapped from one position to the other) always maintained either in contact with terminal 30 or in contact with the stop 34. Should the stem 75 be moved from contact with said terminal 30 by an increase in pressure in the pipe 66 (indicating a substantially corresponding increase in pressure in the conduit 12) so as to move the contact bar 33 away from the terminal, it will be snapped quickly to the other said position.

Surrounding the stem 75 and positioned between the plug 72 and the plunger 74 is a compression spring 83 of such strength that it will maintain the piston 73 and the plunger 74 in their lower position so that the contact bar 33 remains as shown in Figure 1 until the pressure in the system builds up to a fairly high pressure. For instance, I may provide a spring 83 of such strength that the contact bar 33 will be maintained in the position shown until the pressure reaches approximately 2,000 pounds, and of only such strength so that when the pressure reaches more than 2,000 pounds the spring 83 will be compressed to move the contact bar from the position shown, whereupon the spring 82 will quickly throw the contact bar 33 to the stop 34.

The relay 11 is very similar to the relay 9. The pipe 69 leads to the lower end of a casing 84 within which casing 84 is a piston or washer 85, a plunger 86, a stem 87 for the plunger, a spring 88 surrounding the stem, and plugs 89 and 91. All of the above mentioned elements correspond substantially to corresponding parts of relay 9 except that the spring 88 is designed to be compressed through the operative distance only upon the application of a much higher pressure than that required for spring 83. For instance, I may make the spring 88 of such strength that it is only moved the required distance by a pressure of 5,000 pounds or more. The stem 87 carries lugs 92 and 93 which are adjustably spaced and are adapted to bear upon opposite sides of the contact bar 37, the bar being pivoted at 94 and having connected thereto at 95 a tension spring 96 secured to a stationary portion of the system as at 97.

The coupler 13 is adapted to be secured to fittings to be lubricated and thus it is adapted to secure the end of the conduit 12 to said fittings. It is similar in some respects to a coupling device described and claimed in a co-pending application, Serial No. 563,408. It is shown in detail in Figure 4 and as thus shown includes a casing 98, and a sleeve extension 101 which is secured to one end of said casing and which is provided with an end portion 102 forming a clamping member for aiding in securing fittings to the coupler. Thus, as shown in the drawings, it may aid in clamping to the coupler the ball head 103 of a fitting 104. Telescoped within the casing 98 is a tubular plunger 99 formed with concentric bores of differing diameters. Mounted partly within the sleeve 101 and partly within a recess formed within the plunger 99 is a tubular nozzle 105 adapted at its forward end to contact with and supply lubricant to the fitting to be lubricated. Rearward of the nozzle 105 are washers 106 and 107 formed with axial openings through which lubricant may pass and rearward of said washers is a spider 108 having lateral openings 109 through which lubricant may also pass. The spider 109 and the nozzle 105 are normally urged forward by a spring 110 which bears at one end on the spider 109 and at the other end upon a portion of the plunger 99. The spider 109 has a rearwardly extending stem 111 adapted to contact at times (as shown) with a ball valve 112 which is normally urged forward by a spring 113 to a position in which it seats, and in which it prevents the passage of lubricant through the casing. Thus movement of the plunger 99 relative to the casing 98 and to the sleeve 101, through the spring 110, at times causes a corresponding movement of the nozzle 105 and therefore by means of movement of the plunger 99 the head 103 of the fitting 104 may be clamped or released. When, however, the nozzle 105 reaches the position shown in Figure 4, the contact thereof with the head of the fitting prevents further forward movement of the nozzle and thereafter additional forward movement of the plunger 99 causes a compression of the spring 110 and an unseating of the valve 112 which until such time has remained closed.

Means are provided for supplying lubricant to the cavity 113. Secured to the rear end of the plunger 99 is a conduit or pipe 114 which extends rearwardly and is connected to a coupling member 115 of which the switch 41 forms a part and which is itself connected to the flexible conduit 12. It is clear that I could, if desired, connect the pipe 114 directly to the conduit 12 and provide an entirely separate manually operated switch 41.

The coupling member 115 may be connected as shown to the flexible conduit 12 and the pipe 114 by bayonet joint such as 117 and 116.

Means are provided for moving the plunger 99 forward relative to the casing 98. Pivotally mounted upon a portion of the casing 98 at 118 is a handle 119 formed with a bifurcated cam portion 120 adapted to bear upon the rear of plunger 99 and cause its movement relative to the casing 98, the handle 119 coacting with a handle portion 121 of the casing 98 to form a grip for the operator. The handle portion 121 is formed with a pair of lugs 122 and 123 which embrace the pipe 114 and maintain the coupler in proper sliding relationship with said pipe. Surrounding the pipe 114 is a spring 124 bearing at one end upon the lug 122 and at the opposite end upon a stop member 125 secured to the pipe 114. Thus, upon release of the handles, they move to the position shown in Figure 1, from which they may be compressed when desired to the position shown in Figure 4 or to intermediate positions.

I provide means whereby operation of the handles 119 and 121 to the extreme clamped position shown in Figure 4 (after resiliently clamping the fitting in the coupler and after opening the valve 112) also operates the switch 41 to close the circuit. The lug 123 is provided with a projection 126 which is adapted, when the handles 119 and 121 approach their fully compressed position, to contact with a stem 127, which extends through a plug 128 closing one end of a switch casing 129. The stem 127 may be resiliently compressible, if desired, in order to prevent breakage by over compression of the handles 119—121. The portion of the stem 127 which extends within the casing 128 is surrounded by a spring 130 which bears upon a shoulder formed in the casing 129 and upon a washer 131 secured to the stem 127 and thus urges the stem 127 outward of the casing. The inner end of the stem 127 is secured to a contact element 132 adapted when the stem 127 has been pushed inwardly to complete an electric circuit by making a wiping contact with the longitudinally extending terminals 133 and 134, which are in turn connected respectively to the wires 36 and 39. If desired, in lieu of the construction shown, the terminals 133 and 134 may be resiliently telescopic in order to prevent crushing thereof from too much pressure on the stem 127.

In the operation of the system, a predetermined intermediate lubricant pressure high enough to accomplish ordinary lubricating is normally maintained. Assuming, for instance, that the relay 9 is set to maintain a pressure of 2,000 pounds in the flexible conduit 12 and the pump 4, the conduit will still remain so flexible that it can be easily handled by the operator and yet sufficient pressure will be present to lubricate most fittings. A drop of pressure below 2,000 pounds will allow spring 83 to move the plunger 74 downwardly, whereupon the lug 77 will bear upon the contact bar 33 and move it downwardly to the position shown in Figure 1. Thereupon a circuit will be formed from the plug 16 through the wire 15, the wire 36, the contact bar 33, the wire 31, the wire 29, the coil 27, the wire 28 and the wire 18. This will energize the coil 27 and raise the plunger 26 to the position shown to close the switch 8. Thus a circuit will be made from the plug 16 through the wire 18, the switch members 19, 25 and 22, the wire 23, the motor 7 and the wire 15. This will cause operation of the motor 7, and rotation of the shaft 59, the worm 6, the worm wheel 5, and the cam 56. The rotation of the cam 56 will reciprocate the plunger 54 inasmuch as the cam roller 55 is maintained continuously in contact with the cam by the spring 57. The reciprocation of the plunger 54 in the pump barrel 48 forces lubricant past the valve 52 to the conduit 12, and thus builds up pressure in the conduit. The valve 52 prevents the lubricant from returning on the backward stroke of the plunger. As soon as the pressure reaches 2,000 pounds, the piston 73 and the plunger 74 in the relay 9 are pushed upward to compress the spring 83, and the lug 76 moves the contact bar 33 away from the terminal 30 to the stop 34, the spring 81 acting to throw the contact bar quickly and break the electric circuit substantially instantaneously.

In actually servicing lubrication fittings by means of the electrically actuated lubrication system described, the operator grasps one or both of the handles 119 and 121, and, without compressing them, applies the end of the coupler to the fitting to be lubricated. Upon placing the end of the coupler over the fitting, the nozzle 105 may be pushed forward by a camming action, compressing the spring 110 slightly so that the clamp may embrace the fitting. After the fitting has been inserted in the clamp, the operator compresses the handles 119 and 121. The first part of the operation of compressing the handles through operation of the cam 120 on the end of the plunger 99 causes a forward movement of the plunger and, through the spring 110 urges the nozzle 105 resiliently forward to clamp the head 103 of the fitting 104 between the nozzle 105 and the clamping member 102. Until the fitting is clamped, the valve 112 remains on its seat, but further compression of the handles 119 and 121 causes a compression of the spring 110 and causes the plunger 99 to move forwardly over the nozzle 105 and the stem 111. This causes the valve 112 to be moved from its seat to allow lubricant to pass forward into the chamber formed at the rear of the washers 106 and 107, and thence to pass forward through the slots 109 into the bore of the nozzle 105. Thence the lubricant under pressure may pass into the fitting to be lubricated, and at the same time lubricant pressure in the chamber back of the washers 106 and 107 maintains the nozzle securely in contact with the head 103 and the fitting 104. During all of this part of the operation, the lubricant pressure which is being supplied to the coupler 113 through the conduit 12 is the fairly high pressure (assumed to be 2,000 pounds) which is maintained continuously in the conduit by the relay 9. In this normal operation, the handles 119 and 121 are moved from the position shown in Figure 1 to an intermediate position between said position and the extreme compressed position shown in Figure 4. In the lubrication of the usual fitting, it is unnecessary to move the handles beyond said intermediate position. Therefore, compression to the intermediate position in which the fitting is clamped and the valve 112 is unseated, but in which the switch 41 remains open, is the normal compression of the handles.

However, should a bearing difficult to lubricate be encountered, the operator will compress the handles 119 and 121 beyond the normal compression thereof to the position shown in Figure 4. As may be seen therein, the valve 112 has been moved quite a distance from its seat, and the projection 126 formed on the end of the annular lug 123 has contacted with the stem 127 and moved the stem and contact element 132 against the action of the spring 130 to contact with the terminals 133 and 134. Inasmuch as the lubricant pressure in the conduit 12 and the pump 4 will up to such time be maintained at substantially 2,000 pounds, the contact bar 37 will be in contact with the terminal 38. Thus a circuit will be completed from the plug 16, through the wire 15, the wire 36, the terminal 133, the contact element 132, the terminal 134, the wire 39, the terminal 38, the contact bar 37, the wire 32, the wire 29, the coil 27, the wire 28, and the wire 18. Thus regardless of the position of the contact bar 33, the coil 27 will be energized and will thus close the switch 8 to operate the motor and the pump, in a manner similar to that described above in connection with the relay 9. This operation of the pump will continue until the pressure in the conduit 12 and the pump 4 is raised to approximately 5,000 pounds. When the pressure reaches 5,000 pounds, the plunger 86 and the piston 85 will be raised against the action of the relatively strong spring 88 to move the rod 87 and the lug 92 upwardly and move the contact bar 37 away from the terminal 38, the spring 97 completing the throw. If the lubricant pressure is sufficient to clear the fitting before the high pressure of 5,000 pounds is reached, the operator may, if he desires, open the switch 41 by releasing the handles, which action will have a similar effect in stopping the motor (provided, of course that the pressure in the pump and conduit is at the time greater than 2,000 pounds). In all except the most abnormal cases, the 5,000 pounds pressure will be ample to clear all "frozen" fittings and the operator may release the handles and proceed to the next fitting to be lubricated.

In Figure 3 I have shown a modified form of relay control. Therein the pipe 68a leads from a pump such as the pump 4 and is adapted to convey lubricant from the pump to a bore 135 in a member 136. Secured to the upper part of the member 136 is a casing or cover 137, and slidably mounted in the bore 135 is a plunger 74a which carries at its upper end a rod 75a which may operate a contact bar such as the bars 33 and 95 shown in Figure 1. A bushing 139 may be inserted in the upper part of the casing 137 and provide a bearing through which the rod 75a passes. The plunger 74a is provided with a circular plate or cover 141, and surrounding the rod 75a between the plate 141 and the bushing 139 is a spring 83a which normally urges the plunger 74a downwardly. The spring 83a is of such strength that it will maintain the plunger 74a and rod 75a in the position shown until the lubricant pressure in the pipe 68a is raised to a definite amount. For instance, the spring 83a may be of such strength that it is necessary to provide a pressure of 2,000 pounds in the pipe 68a in order to move the plunger upwardly. A similar relay may also be provided equipped with a spring requiring a lubricant pressure of 5,000 pounds for its operation. The member 135 is provided with another bore 143 arranged at right angles to the bore 134 and adapted to communicate with the interior of the casing 136, and connected to the bore 143 is a pipe 144 which leads to a lubricant container such as the container 2. For the purpose of preventing lubricant from passing upwardly along the rod 75a and possibly fouling the electric circuit, there is secured to the member 136 and to the outer edge of the plate 141 a bellows or collapsible sleeve 145.

The operation of this relay is in all respects similar to that shown in Figure 1. However, the danger of lubricant leaking past the piston and being extruded from the relay is made almost negligible by reason of the fact that any lubricant which gets past the plunger 74a will be stopped by the bellows 145 and allowed to return to the low pressure container 2 by means of pipe 144.

In Figure 2 a different form of pressure control is shown. Therein the pump 4a is maintained in continuous operation by reason of the fact that the motor, not shown, is directly connected to the source of electrical energy. However, I provide means for preventing lubricant in the pump 4 and the flexible conduit 12 from being raised to undesirably high pressures. Lubricant supplied from the container 2a to the pump 4a passes downwardly from the container through an outlet opening 146. It is forced by the pump into the flexible conduit 12a in the same manner as that described above in connection with Figure 1.

However, means are provided whereby the lubricant may be by-passed back to the container 2a should pressure become too high. The pump barrel 147 has formed integrally therewith a casing 148 connected by an opening 149 with the bore 151 of the pump barrel 147. Within the casing 148 there is slidably mounted a plunger 152 adapted normally to maintain a valve 153 upon its seat. Of course the valve could, if desired, be connected to the conduit 12a instead of direct to the pump. The plunger 152 has an upwardly extending stem 154 which passes through a plug or bushing 155 and at its upper end contacts with a stop screw 156 adjustably secured within a cross-arm member 157. Surrounding the rod 154 within the casing 148 is a compression spring 158 which normally bears at its lower end upon the plunger 152 and at its upper end upon the plug 155. The cross arm member 157 has one end pivotally joined at 159 to a core element 161 of an iron clad plunger magnet generally designated 162. The opposite end of the cross arm member 157 carries a pin 163 adapted to move in a slot 164. However, the pin 163 is normally kept at the low end of the slot 164, inasmuch as the associated end of the cross arm 157 is normally maintained in its downward position by means of a relatively strong spring 165, bearing at its lower end upon the end of the cross arm member 157 and at its upper end upon an adjustable screw 166. The iron clad plunger magnet 162 also includes a coil 167 to the opposite ends of which are connected electric wires 168 and 169 leading to a source of electrical energy not shown. Interposed in one of the wires such as 168 is a switch 171 which may be if desired, similar to the switch 41 already described.

In the operation of this system the pump 4a, being continuously operated, will force lubricant under pressure into the flexible conduit 12a. However, should the pressure exceed the limit imposed by the spring 158 (such as 2,000 pounds), the valve 153 will normally be moved from its seat pushing upwardly the plunger 152 and the rod 154 and causing the cross arm 157 to pivot about the pin 163. Thus lubricant may be by-passed through the bore 150 back to the low pressure cylinder 2a. Should it be desired to raise the pressure to a higher pressure (such as 5,000 pounds), the operator will close the switch 171. This will complete the circuit through the magnet 162 and will thus cause the core 161 to be held in its lowest position. Thereupon, in order for the pressure to move the valve 153 from its seat, it will be necessary not only to compress the spring 158 but also to compress the spring 165. Thus a much higher pressure will be maintained in the pump and in the flexible conduit.

In Figure 6 is shown a type of switch which may be substituted, if desired, for the switch 41 shown in Figures 1 and 4. Therein a stem 172 which corresponds substantially to the stem 127 shown in Figures 1 and 4 is located on the opposite side of the coupling generally designated 173 so that it may be actuated by the main part of a handle corresponding to the handle 121. Connected to the lower part of the casing 174 of the coupling 173 is a swivel joint 175 connected at its opposite end to a rigid conduit 176 which is adapted to be secured to a swivel coupling 12 of the usual type, thus providing a universal joint. Pivotally mounted at 178, within the casing 174, is a lever 179 upon one end of which the stem 172 bears, and the other end of which is formed with a projection 181 which is rounded and adapted to contact with a washer 182 secured on the end of a short stem 183, in turn secured to a contact element 184. Bearing against the upper side of the washer 182 is the lower end of a spring 185, and inasmuch as the upper end of the spring seats on a shoulder formed in the casing, the contact element 184 is normally maintained in the open position shown in Figure 6.

Upon downward movement of the stem 172, by reason of downward movement of the handle of the coupler, the lever 179 will be rocked on its pivot to force the contact element 184 against the action of the spring 185 into contact with the terminals 186 and 187. Thus an electric circuit will be completed through the wires 188 and 189, which correspond to the wires 36 and 39 shown in Figure 1.

In Figure 5 I have shown a somewhat simpler form of combined coupler and switch similar in many respects to the coupler shown in Figure 4. However, in the modification disclosed in Figure 5, the handle 121a does not bear upon a stem as in Figure 4, but instead there is provided, secured to but insulated from the pipe 114a, a switch box 115a to which wires 39a and 36a are connected and there is provided a manually operated switch button 192 by means of which the circuit can be completed. If desired, in lieu of the button 192 a projection 193 could be automatically operated by compression of the handles.

This form of coupler and switch operates somewhat similarly to the form disclosed in Figure 4. After the fitting has been clamped and lubricant supplied thereto under fairly high pressure, manual operation of the button 192 causes a completion of the electric circuit, by means of which much higher pressure may be obtained.

It is to be understood that the above described embodiments of my invention are for the purpose of illustration only, and various changes may be made therein without departing from the spirit and scope of the invention.

I claim:

1. In a lubrication system, a source of lubricant supply, a lubricant pump associated with said source of lubricant supply, an electric motor for operating said pump, an electric circuit for controlling said motor, a cylinder connected with said pump, a plunger in said cylinder, an electric switch included in said electric circuit, means operated by the plunger for controlling said switch, and a manually operated switch also included in said circuit shunted across said first named switch.

2. In a lubrication system, a conduit, means for automatically maintaining lubricant under one pressure in said conduit, means for automatically maintaining lubricant under a different pressure in said conduit, and means for selectively making one of said automatic pressure maintaining means effective or ineffective.

3. In a lubrication system, a conduit, means for automatically maintaining lubricant under a certain predetermined pressure in said conduit, means for automatically maintaining lubricant under a different pressure in said conduit, and means for selectively making either of said automatic pressure maintaining means effective or ineffective.

4. In a lubrication system, a conduit, means selectively effective for automatically maintaining lubricant under a certain predetermined pressure in said conduit, means effective whenever said first means is ineffective for automatically maintaining lubricant under a different pressure in said conduit and means for selectively making said first named automatic pressure maintaining means effective or ineffective.

5. In a lubrication system, a conduit, a pump for supplying lubricant to said conduit, an electric motor, means including said electric motor and said pump for maintaining lubricant under a certain predetermined pressure in said conduit, means also including said pump and said motor for maintaining lubricant under a certain other predetermined pressure in said conduit, and an electric switch associated with one of said pressure maintaining means.

6. In a lubrication system, a source of lubricant under relatively low pressure, means for increasing the pressure on the lubricant, means dependent upon the pressure on the lubricant in said system for controlling said pressure increasing means and for maintaining the pressure at a certain predetermined amount, a second means also dependent upon the pressure on the lubricant in said system for controlling said pressure increasing means and for maintaining the pressure at a second predetermined amount, and an electric switch for making said last named means selectively either operative or inoperative.

7. In a lubrication system, a primary source of lubricant under relatively low pressure, a pump for placing the lubricant under higher pressure, a flexible conduit connected to the pump, a coupler for securing the conduit to a lubricant receiving fitting, an electric motor for operating said pump, an electric switch mounted on said coupler, an electric relay operable to actuate said motor whenever the lubricant pressure drops below a predetermined fairly high pressure and operable normally to stop said motor whenever the pressure exceeds said predetermined pressure, a second electric relay operable when said switch is closed to maintain a relatively high pressure, and inoperative when said switch is open.

8. In a lubrication system, a source of lubricant supply, a lubricant pump associated with said source of supply, an electric motor for operating said pump; an electric circuit for controlling said motor; a plurality of electric relays connected in parallel in said circuit for controlling said supply of current, each of said relays comprising a cylinder associated with said pump, a plunger mounted in said cylinder, and a switch included in said circuit, and controlled by said plunger; and a manually operated switch included in said circuit in series with the switch of one of said relays.

9. In a lubrication system, means for mechanically clamping a fitting to be lubricated, means for supplying lubricant under pressure to said fitting, means for increasing the pressure acting on said lubricant, and means operable by a single manual act for actuating said first mentioned three means in a predetermined succession.

10. In a lubrication system, a coupler, means for supplying lubricant to said coupler, an electric circuit for controlling said lubricant supplying means, a switch included in said electric circuit, relatively slidable elements associated with said coupler, and means responsive to relative sliding of said elements for controlling said switch.

11. In a lubrication system, means for clamping a fitting to be lubricated, an electric switch, a pair of handles, means responsive to relative movement of said handles for actuating said clamping means and for operating said switch.

12. In a lubrication system, a lubricant conduit, a handle associated with said conduit having a pair of lugs through which said conduit may slide, means to cause said conduit to slide through said lugs, and an electric switch operable by relative sliding movement of said handle and said conduit.

13. In a lubrication system for supplying lubricant to a fitting, a coupler, means for supplying lubricant to said coupler, an electric circuit controlling said lubricant supplying means, a movable element associated with said coupler, means operable by motion of said movable element for clamping the fitting to be lubricated in said coupler, and means operable by motion of said movable element for controlling said electric circuit.

14. In a lubrication system, a pump for supplying lubricant having a by-pass associated therewith, a conduit to which lubricant is supplied by said pump, means for controlling pressure of lubricant in said conduit including a valve controlling the by-pass, a spring acting on said valve, a second spring associated therewith, and electrically controlled means for adding the force of the second spring to the force of the first spring acting on said valve.

15. In a lubrication system, a pressure operated control comprising a tubular member formed with a chamber to which lubricant under pressure may be supplied, a member slidable in said chamber and on which said lubricant under pressure is adapted to bear, a spring bearing on said slidable member, a stem associated with said slidable member, a cross bar having an element against which a part of said stem is adapted to bear, a solenoid having a movable element pivotally connected to said cross-bar, a pin also secured to said cross-bar, a support having a slot in which said pin is adapted to slide, and a spring bearing upon said cross-bar adjacent to said pin.

16. In a lubricating system, an electrically operated lubricant pump, a lubricant feed conduit, a coupler adapted for connection to said conduit, said coupler having elements manually movable to attach the coupler to a lubricant receiving fitting, a member forming a rigid conduit adapted to be detachably connected between said coupler and said first named conduit, and a switch fixed to said member arranged to operate upon relative movement of said coupler members for controlling said electrically operated pump.

17. In a lubricant supply system, a source of lubricant, means for placing a portion of said lubricant under an initial pressure, means for predetermining said initial pressure, and means operative to effect an increase in pressure on some of said lubricant and, simultaneously, to render said pressure determining means inoperative.

18. In a lubricant supply system, a source of lubricant supply, a pump, an electric motor for driving said pump, a plurality of lubricant pressure responsive devices for controlling the operation of said motor, an electric circuit for said motor, and means in the motor circuit for rendering any of said pressure responsive devices inoperative.

19. In a lubricant supply system, a lubricant pump, an electric motor for driving said pump, a lubricant discharge line from said pump, a pressure responsive device in said discharge line, an electric circuit for said motor including said pressure responsive device, and means in said circuit for short circuiting said pressure responsive device.

20. In a lubricant supply system, a lubricant pump, a prime mover for operating said pump, a lubricant discharge line from said pump, a pressure responsive device in said discharge line for controlling the operation of said prime mover, a circuit including said prime mover and said pressure responsive device, and means for short circuiting said pressure responsive device.

21. In a lubricant supply system, a lubricant pump, an electric motor for operating said pump, a lubricant discharge line from said pump, an electric circuit including said motor, a switch in said circuit, means automatically operative to open said switch and the motor circuit after attainment of a predetermined load upon the motor, and means for short circuiting said switch.

22. In a lubricant supply system, a lubricant pump, a lubricant discharge line from said pump, a pressure responsive device in said discharge line for controlling the pressure therein, and an electric circuit including a switch for varying the effectiveness of control of lubricant pressure by said pressure responsive device.

23. In a lubricant supply system, a lubricant pump, an electric motor for driving the said pump, automatic means for controlling the said motor so as to limit the lubricant pressure developed by the said pump, and manually operable means for rendering the said automatic means inoperative when higher lubricant pressures are desired.

24. In a lubricant supply system, a source of lubricant supply, a pump having an intake connected with said source of supply, a motor for driving said pump, a plurality of lubricant pressure responsive devices for controlling the effective operation of said pump under different conditions, means for supplying power to said motor, and means connected with said power supply means for rendering one of said pressure responsive devices inoperative.

JOHN L. CREVELING.